May 8, 1962 J. R. MUNCK AF ROSENSCHÖLD ET AL 3,034,030
ROTARY ELECTRIC MACHINES
Filed July 8, 1959
3 Sheets-Sheet 1

INVENTORS
BY
ATTORNEY

United States Patent Office 3,034,030
Patented May 8, 1962

3,034,030
ROTARY ELECTRIC MACHINES
John Rutger Munck af Rosenschöld, Saltsjobaden, and Fredrik Axel Dahlgren, Djursholm, Sweden, assignors to Atlas Copco Aktiebolag, Nacka, Sweden, a corporation of Sweden
Filed July 8, 1959, Ser. No. 825,689
11 Claims. (Cl. 318—172)

This invention relates to rotary electric alternating current machines. One object of the invention is to make possible the operation of such machines at a speed which is higher than the synchronous speed determined by the number of poles and the frequency of the alternating current. Another object of the invention is to provide a machine which may be operated at two or more speeds. The invention may be employed in motors as well as in generators. In connection with motors the invention makes it possible to run the driven shaft with a speed which is greater than said synchronous speed and in connection with generators to run the prime mover with a speed which is higher than said synchronous speed without the use of a toothed gear transmission or with a gear transmission with reduced transmission ratio. A further object of the invention is to provide a simple and inexpensive motor or generator design. For the above and other purposes we provide a rotary electric alternating current machine having a stator with a winding supplied from an alternating current network, a main rotor with a winding supplied from an alternating current network, and an intermediate rotor between said stator and said main rotor, said intermediate rotor comprising an iron core and one or more short circuit windings, preferably in the shape of squirrel cage windings. According to the invention the stator and rotors may preferably be arranged concentrically which arrangement results in a concentrated machine with low leakage. However, the stator and rotors may also be arranged one after the other in a coaxial arrangement.

The invention is illustrated by way of example and described in the following specification in connection with a doubly fed induction motor having stator and rotors arranged concentrically or coaxially one after the other, but it should be understood that the invention is not limited to these embodiments and may be varied in several different ways within the scope of the claims.

In the drawings FIGS. 1–6 illustrate diagrammatically the arrangement of a doubly fed motor according to the invention. FIGS. 7 and 8 illustrate diagrammatically two different arrangements of the main components of such a motor.

A disadvantage of the ordinary induction motor is that such a motor cannot be operated at a higher speed than the synchronous speed which in a two-pole arrangement corresponds to the frequency of the current. At a frequency of 50 cycles per second the highest speed which may be obtained is 3000 revolutions per minute. When it is desired to achieve a substantially higher speed, e.g. 6000 revolutions per minute, it has been suggested to use doubly fed induction motors. Such a motor is supplied with electric current of the network frequency to the stator as well as to the rotor, the rotor being obviously supplied over brushes and slip rings. If the phase sequence in the stator is opposite to the phase sequence in the rotor, a synchronous speed is obtained which corresponds to twice the frequency of the network current at the number of poles in question. In a 2-pole arrangement with a 50 cycle current the machine is able to pull into step and to run as a synchronous motor at 6000 revolutions per minute.

The doubly fed induction motor, however, has two serious disadvantages. Firstly, the motor must be accelerated by auxiliary means to a speed close to the above mentioned synchronous speed and, secondly, when such a motor is operated at the synchronous speed it has an inherent tendency to oscillate mechanically owing to negative damping with variations of the synchronous lead angle. The abovementioned disadvantages may be avoided or reduced by various means which, however, involve considerable complications of the machines.

The two abovementioned disadvantages may, however, be avoided in a simple manner by providing the motor with an intermediate rotor comprising an iron core with one or more short circuit windings, said intermediate rotor running at substantially half the speed of the main rotor. It is often desirable to operate the doubly fed motor selectively at several speeds so that the motor may easily be switched over from one speed to another.

According to the invention an electric motor may be built which avoids the abovementioned disadvantages and which comprises a doubly fed induction motor of conventional design which is provided with an extra large air gap between the stator and the main rotor and which has a comparatively thin intermediate rotor provided with a cage winding and arranged to rotate freely in said air gap between the stator and the main rotor and supported in bearings in the stator or in bearings on the main rotor shaft.

The general design of this motor is obvious from FIG. 1 in which the various details are denoted by the following reference numerals:

The motor is provided with a stator core 1 and a main rotor 2 disposed inside the stator core. In addition, there is provided an intermediate rotor 3 on which there is arranged a squirrel cage winding 6. The winding on the stator core is a three-phase winding 4 and on the main rotor a three-phase winding 5. The winding 5 is connected through slip rings 7 and brushes to a three-phase network source 8 in parallel with the connection of the rotor to the stator winding 4 although obviously the two windings may be series connected to the source 8. A switch 9 is disposed in the connections between the windings on the stator and rotor and the source 8. The phase sequence of the winding of the main rotor is opposite to the phase sequence of the stator winding.

During the acceleration period of the motor the intermediate rotor serves as a secondary circuit for the stator winding as well as for the rotor winding. This means that during the acceleration period the intermediate rotor is accelerated to a speed close to the synchronous speed whereas the main rotor is accelerated to a speed which relatively to the intermediate rotor is close to the synchronous speed, i.e. to a speed which is approximately twice the synchronous speed with regard to the stator. If the intermediate rotor is designed with a sufficient area of the copper winding, the motor is self-synchronising and operates at exactly twice the synchronous speed.

With the aid of the intermediate rotor, which requires very little space and reduces the efficiency of the machine at full speed very little, a simple method is obtained for accelerating the machine to working speed and for synchronizing it. Simultaneously the intermediate rotor provides an efficient damper winding for main rotor oscillations. Practical tests have shown that the motor here described may be carried out completely free from mechanical oscillations at no-load as well as at load. Furthermore, the intermediate rotor yields the advantage that, if the motor is overloaded and falls out of step, the motor continues to run asynchronously and that later on, when the overload has been eliminated, the motor by itself returns to synchronous speed.

In order to simplify the following description it is assumed that the machine is provided with 2 poles (and in certain arrangement with 4 poles) and that the frequency of the alternating current is 50 cycles per second. At full speed the obtained synchronous speed is then 6000 revolutions per minute. However, the above discussion is obviously applicable for other frequencies as well as for other numbers of poles. However, a higher number of poles than 2 and 4 would obviously be without practical interest.

The above described arrangement has in some cases a certain disadvantage which follows from the fact that the motor has a tendency to remain at a speed considerably below the desired synchronous speed. This is due to the fact that owing to the magnetic coupling between the three circuits of the stator and rotors a definite minimum of the motor torque is obtained in the neighbourhood of 4000 revolutions per minute. This is called a saddle effect. In certain cases said minimum torque may in fact be negative resulting in that the motor remains at a speed within this speed range, and then the intermediate rotor as well as the main windings are badly heated by short-circuit currents. This phenomenon may easily be explained theoretically, and it is also possible to provide a remedy therefor. Such a remedy is also included in the present invention and consists in the provision of inductive or capacitive elements connected in series in the stator and rotor circuits and causing an increase of the leakage reactance of said circuits. These inductive or capacitive reactors should, however, be connected in the circuits only during the acceleration period or during a part of said period, and they should consequently be short-circuited during normal operation at 6000 revolutions per minute.

FIG. 2 illustrates diagrammatically a complete arrangement of a machine with the above mentioned auxiliary means for improving the acceleration conditions of the machine and also with means for varying the speed of the machine as will be described hereinbelow. The details of the machine according to FIG. 2 which correspond to equivalent details in FIG. 1 have been indicated by the same reference numerals as in FIG. 1 and are not described again.

The above mentioned reactors serving to momentarily change the leakage reactances of the main windings are illustrated in FIG. 2 at 11 and 12, and a switch 13 is also illustrated which serves to short-circuit said reactors when they are not desired in the circuits. The arrows indicated K and O at the switch 13 indicate the short circuit condition of the reactors and the condition with the reactors connected in their respective circuits. In FIG. 2 the reactors have been illustrated separately in the stator circuit and the main rotor circuit. However, said reactors may also be placed in the common supply conductors of said circuits or they may be disposed as indicated in FIG. 2 and connected together inductively so that the elements belonging to the same phase of the two circuits are wound on a common iron core.

With the use of the indicated reactors, the motor may be accelerated with the switch 13 in the open position O and when the main rotor is close to or exactly at 6000 revolutions per minute the switch 13 is closed and brought to the position K. If suitable automatic means are provided the position O may be utilized only within the range of the above mentioned critical speed so that a better starting and acceleration torque is maintained over a greater part of the speed range.

As mentioned above the indicated acceleration difficulties result from the magnetic coupling between the three circuits of the stator, the intermediate rotor and the main rotor. The intermediate rotor which has been assumed to be provided with a squirrel cag winding is of course coupled to both of the other circuits, whereas the coupling between the stator and the main rotor depends upon the fact that both windings have the same number of poles. It should be pointed out in this connection that both the stator and main rotor windings during the acceleration period are subject to heavy subharmonic currents. It is obviously possible to avoid the magnetic coupling between the stator and the main rotor by providing said elements with different numbers of poles. The stator may for instance have 4 poles and the main rotor 2 poles. In such a case the tendency of the motor to remain at a critical speed is eliminated whereas the final or maximum speed of the motor differs from the 6000 revolutions per minute mentioned above. Assuming the above mentioned arrangement with 4 and 2 poles a maximum speed of close to 4500 revolutions per minute is obtained at which speed the motor runs asynchronously and consequently a certain slip must be expected. With this arrangement it is possible without the use of the above mentioned reactors 11 and 12 to obtain an undisturbed start and acceleration to a maximum speed close to 4500 revolutions per minute. This arrangement forms a part of the invention, when it is desired to obtain a multi-speed arrangement, and for this purpose the stator winding may be provided with a pole-change connection, for instance according to the well known principle which is usually referred to as the Lindström-Dahlander pole-change connection. This pole-change connection is illustrated in FIG. 2 in which the stator winding 4 in a maner known is divided in two parts by means of a mid tapping and connected to the network over a pole-change switch 14. In FIG. 2 the arrows P=2 and P=4 indicate the positions of the pole-change switch for 2-pole and 4-pole arrangement of the stator winding. With this arrangement it is possible to start and accelerate the motor to close to 4500 revolutions per minute and then by changing over the switch 14 to the position P=2 to obtain the high synchronous speed of 6000 revolutions per minute. If difficulties should arise at critical speeds between 4500 and 6000 revolutions per minute the connection of reactors 11 and 12 during the acceleration period between said speeds may be used. The intermediate speed 4500 revolutions per minute with a certain slip may obviously be used on the one hand to obtain an undisturbed acceleration and on the other hand to give an extra operating speed. In some cases it may be suitable to use the 4500 revolutions per minute as the normal operating top speed.

A still further operating speed may be obtained if the main rotor winding is short-circuited and the stator winding connected in the 2-pole arrangement. The motor then runs as an ordinary 2-pole induction motor with a certain slip. A switch for obtaining these operating conditions is illustrated at 15 in FIG. 2 in which the arrow A indicates the position where the main rotor is connected to the network, and the arrow K indicates the position in which the main rotor is short-circuited. There are provided in the main rotor circuit resistances 16 for the purpose of limiting of the current during the acceleration to 3000 revolutions per minute. It is assumed (although not illustrated) that said resistances may be short-circuited and in certain cases connected stepwise.

The various operating conditions which have been described hereinabove may be more easily understood by a study of the diagrammatic illustration in FIGS. 3–6 which for simplicity is made on a one pole basis.

FIG. 3 illustrates diagrammatically the asynchronous operation at 3000 revolutions per minute. In this case the stator is in 2-pole connection and the main rotor is short circuited. The reactors 11, 12 are also short circuited.

Figure 6:
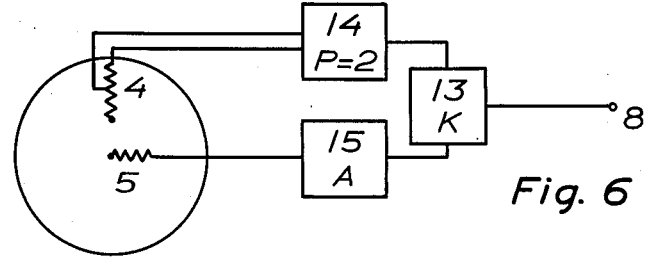

FIG. 6 indicates the final operating condition at 6000 revolutions per minute when the reactors 11, 12 are short-circuited.

Figure 1:
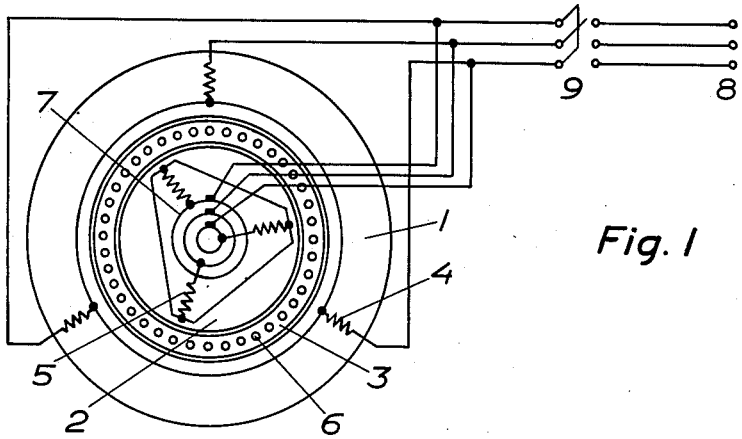
Figure 2:
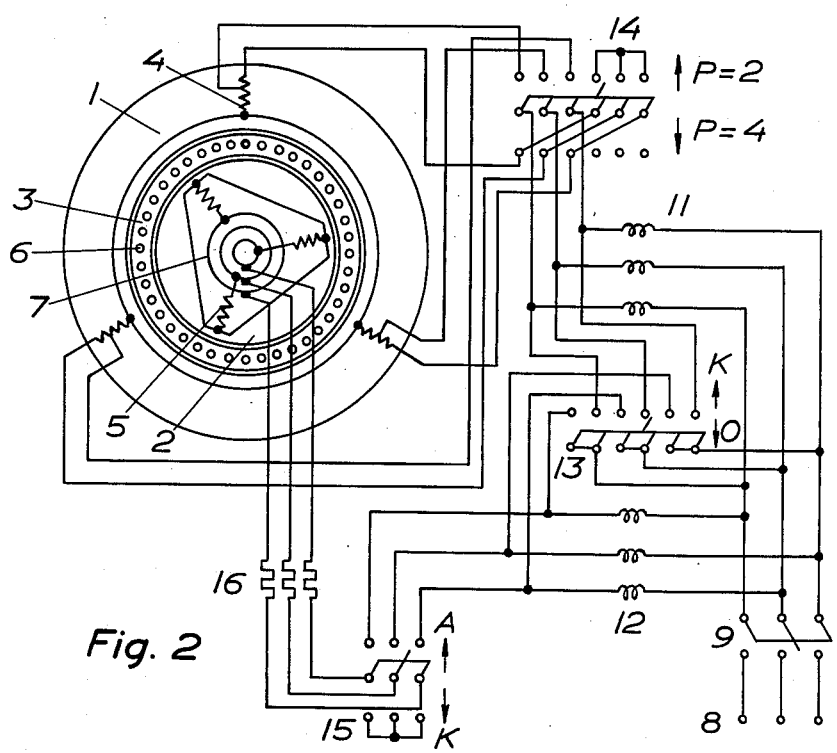
Figure 3:
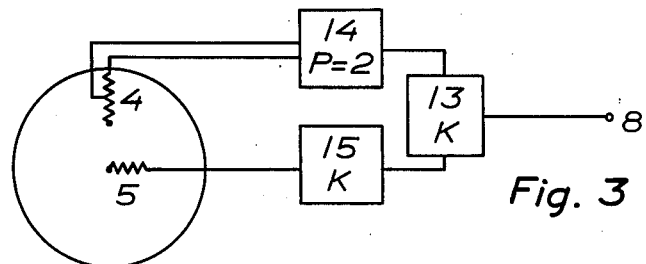
Figure 4:
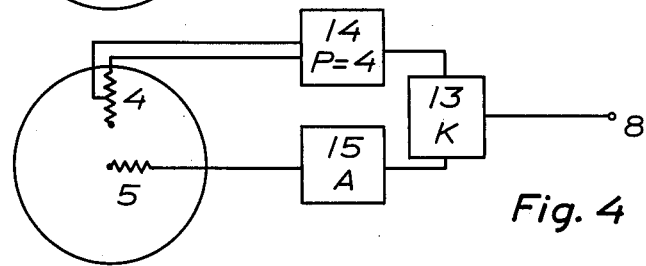
FIG. 4 illustrates the asynchronous operation at 4500 revolutions per minute, i.e. with the stator winding in 4-pole connection and the rotor-winding connected to the network. The reactors 11, 12 are short-circuited.
Figure 5:
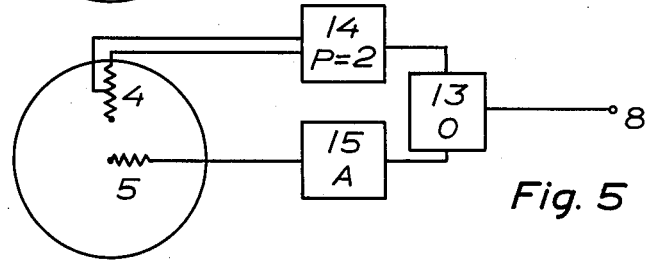
FIG. 5 illustrates the arrangement during the acceleration to 6000 revolutions per minute when the reactors 11, 12 are connected in the rotor and stator circuits and the reactor switch 13 consequently in the position O. The stator is then in 2-pole connection and the main rotor connected to the network.

It is obvious that the auxiliary means indicated in FIG. 2, which in the different cases may form a part of the equipment, are connected in a suitable manner by operating means, for instance drum controllers and sometimes automatic devices. As above mentioned, the invention also includes such variations of the above given simplified description when other frequencies are used and when other numbers of poles are utilized.

Figure 7:
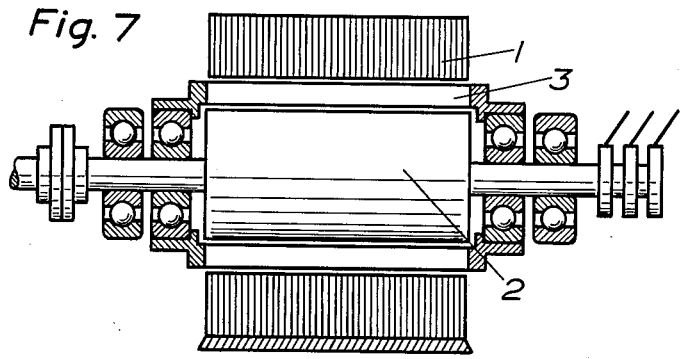

FIG. 7 illustrates diagrammatically an axial section of a machine according to FIGS. 1–6 in which 1 indicates the stator, 2 the main rotor and 3 the intermediate rotor which may be mounted in bearings on the main rotor shaft or in the stator.

Figure 8:
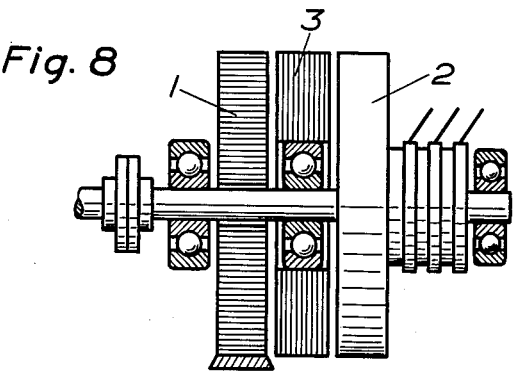

FIG. 8 shows a modification in which the stator 1, the intermediate rotor 3, and the main rotor 2 are of disc shape and arranged co-axially one after the other.

The embodiments of the inventions above described and illustrated in the drawings should only be considered as examples, and the invention may be modified in various different ways within the scope of the following claims.

What we claim is:

1. A rotary electric alternating current device comprising a stator member having a winding, an alternating current source connected to said winding, a main rotor member having a winding connected to said alternating current source, an intermediate rotor disposed between said stator member and said main rotor member, said intermediate rotor comprising an iron core having at least one short circuited winding, switching means connected to the winding of one of said members for selectively altering the number of poles thereof whereby said device may be adapted to operate in a synchronous or an asynchronous state and said intermediate rotor may serve to dampen the mechanical oscillations of the main rotor member.

2. A device as defined in claim 1 in which the intermediate rotor is a freely rotating comparatively thin iron body which substantially fills the air gap between the stator and the main rotor members, said members being arranged concentrically and said iron body being provided with at least one squirrel cage winding.

3. A rotary electric alternating current device comprising a stator member having a winding, an alternating current source connected to said winding, a main rotor member having a winding connected to said alternating current source, an intermediate rotor disposed between said stator member and said main rotor member, said intermediate rotor comprising an iron core having at least one short circuited winding, a reactance element, a means for selectively connecting the reactance element on the winding of one of said members whereby said reactance element may serve to neutralize any undesirable saddle effect arising when said device is operated synchronously.

4. A rotary electric alternating current device comprising a stator member having a winding, an alternating current source connected to said winding, a main rotor member having a winding connected to said alternating current source, an intermediate rotor disposed between said stator member and said main rotor member, said intermediate rotor comprising an iron core having at least one short circuited winding, switching means connected to the winding of said stator member for selectively altering the number of poles thereof whereby said device may be adapted to operate in a synchronous or an asynchronous state and said intermediate rotor may serve to dampen the mechanical oscillations of the main rotor member.

5. An electric machine according to claim 1 in which one of the windings on the members is provided with a center tap connection to said switching means which permit acceleration of the main rotor through a portion of the speed range with different numbers of poles in the stator and main rotor windings.

6. An electric machine according to claim 3 in which a reactance element is provided and in which means are provided for selectively connecting said reactance element to the alternating current source, said reactance element being dimensioned to neutralize the undesirable saddle effect in the torque which with windings on the members of the same number of poles is produced by the magnetic coupling between the stator winding and the main rotor winding.

7. An electric machine according to claim 3 in which said alternating current source is a three-phase source and there is a winding on each member connected to one phase of said three-phase source and in which a reactance element is connected to each of said windings, the reactance elements which are connected to windings of the same phase being arranged on a common iron core.

8. An electric machine according to claim 7 in which the reactance elements are placed in the common supply conductors from the alternating current source to the stator member and the main rotor member windings.

9. An electric machine according to claim 4 in which the stator winding is arranged for pole-change connection and in which a pole-change switch is provided for producing the change of the number of poles of the stator winding.

10. An electric machine according to claim 1 in which the main rotor circuit includes a switch by means of which the main rotor winding may be connected to the alternating current source or short-circuited.

11. An electric machine according to claim 10 in which series resistors are provided in the main rotor circuit and in which said switch is arranged for short-circuiting said resistors.

References Cited in the file of this patent

UNITED STATES PATENTS

| | | |
|---|---|---|
| 1,237,681 | Nauland | Aug. 21, 1917 |
| 1,675,960 | Schon et al. | July 3, 1928 |
| 1,913,211 | Prince | June 6, 1933 |
| 2,246,372 | Lockwood et al. | June 17, 1941 |
| 2,666,174 | Pestarini | Jan. 12, 1954 |